(12) United States Patent
Shibui et al.

(10) Patent No.: US 7,367,190 B2
(45) Date of Patent: May 6, 2008

(54) SUPERCHARGER WITH ELECTRIC MOTOR

(75) Inventors: Yasuyuki Shibui, Tokyo (JP); Masahiro Shimizu, Tokyo (JP)

(73) Assignee: IHI Corp., Tokyo (JP)

( * ) Notice: Subject to any disclaimer, the term of this patent is extended or adjusted under 35 U.S.C. 154(b) by 0 days.

(21) Appl. No.: 11/463,665

(22) Filed: Aug. 10, 2006

(65) Prior Publication Data
US 2007/0036664 A1 Feb. 15, 2007

(30) Foreign Application Priority Data
Aug. 11, 2005 (JP) ............................. 2005-233772

(51) Int. Cl.
F02B 33/44 (2006.01)
F02B 37/00 (2006.01)
F02B 37/16 (2006.01)
F02B 37/14 (2006.01)
F02B 37/12 (2006.01)
F02B 37/10 (2006.01)
F04B 39/06 (2006.01)
F04B 39/02 (2006.01)
F04D 31/00 (2006.01)
F04D 23/00 (2006.01)

(52) U.S. Cl. .................. 60/608; 60/607; 60/605.3; 290/52; 417/366; 417/367; 417/423.8; 417/423.13; 417/423.7; 415/116; 415/95; 415/53.1

(58) Field of Classification Search ........... 60/605.3, 60/607–609; 290/52; 417/406–407, 409, 417/366–367, 423.7, 423.8, 423.13; 415/53, 415/95, 116, 53.1–53.3
See application file for complete search history.

(56) References Cited

U.S. PATENT DOCUMENTS

| 4,253,031 A | * | 2/1981 | Frister | 60/607 |
| 4,745,755 A | | 5/1988 | Kawamura | 60/608 |
| 4,757,686 A | | 7/1988 | Kawamura et al. | 60/608 |

(Continued)

FOREIGN PATENT DOCUMENTS

DE  41 15 273 C1  6/1992

(Continued)

OTHER PUBLICATIONS

Office Action issued in related U.S. Appl. No. 11/463,090, dated Jul. 10, 2007.

(Continued)

Primary Examiner—Thai-Ba Trieu
(74) Attorney, Agent, or Firm—Griffin & Szipl, P.C.

(57) ABSTRACT

In a supercharger (10) with an electric motor in accordance with the present invention, the electric motor (20) is arranged at a position adjacent to a compressor impeller (6), a center housing (14) has a cooling fluid flow path (34) formed in such a manner as to surround the electric motor (20) and be adjacent to a diffuser portion (25). A first cooling structure portion (38) is formed at a position in the electric motor (20) side in the cooling fluid flow path (34), a second cooling structure portion (39) is formed at a position in the diffuser portion (25) side in the cooling fluid flow path (34). The electric motor (20) is cooled by the first cooling structure portion (38). The diffuser portion (25) is cooled by the second cooling structure portion (39).

7 Claims, 3 Drawing Sheets

U.S. PATENT DOCUMENTS

| | | | |
|---|---|---|---|
| 4,833,887 A | 5/1989 | Kawamura et al. | 60/608 |
| 5,121,605 A * | 6/1992 | Oda et al. | 60/608 |
| 5,323,613 A | 6/1994 | Akiyama | 60/608 |
| 5,789,587 A | 8/1998 | Lee | 310/54 |
| 5,857,332 A * | 1/1999 | Johnston et al. | 60/607 |
| 5,904,471 A | 5/1999 | Woollenweber et al. | 417/423.14 |
| 6,032,466 A * | 3/2000 | Woollenweber et al. | 60/607 |
| 6,102,672 A | 8/2000 | Woollenweber et al. | 417/366 |
| 6,160,332 A * | 12/2000 | Tsuruhara | 310/54 |
| 6,218,747 B1 | 4/2001 | Tsuruhara | 310/54 |
| 6,257,834 B1 * | 7/2001 | Bremer et al. | 417/406 |
| 6,278,199 B1 | 8/2001 | Grant et al. | |
| 6,416,281 B1 * | 7/2002 | Bremer et al. | 416/95 |
| 6,449,950 B1 | 9/2002 | Allen et al. | 60/607 |
| 6,609,375 B2 * | 8/2003 | Allen et al. | 60/607 |
| 6,647,724 B1 | 11/2003 | Arnold et al. | 60/608 |
| 6,668,553 B1 * | 12/2003 | Ghizawi | 60/605.3 |
| 7,010,916 B2 * | 3/2006 | Sumser et al. | 417/407 |
| 2003/0118461 A1 * | 6/2003 | Hodapp et al. | 417/423.7 |
| 2006/0123783 A1 * | 6/2006 | Philippe | 60/607 |
| 2006/0245913 A1 * | 11/2006 | Thiele et al. | 415/116 |

FOREIGN PATENT DOCUMENTS

| | | |
|---|---|---|
| DE | 100 22 113 A1 | 11/2001 |
| DE | 101 56 704 A1 | 5/2003 |
| DE | 10 2005 052 363 A1 | 5/2007 |
| EP | 0 212 988 | 3/1987 |
| EP | 1 348 848 A2 | 10/2003 |
| FR | 2 859 499 A1 | 3/2005 |
| GB | 2 021 874 A | 12/1979 |
| JP | 01019122 | 1/1989 |
| JP | 02-99722 | 4/1990 |
| JP | 03138430 A | 6/1991 |
| JP | 05199708 A | 8/1993 |
| JP | 06346748 A | 12/1994 |
| JP | 07102988 A | 4/1995 |
| JP | 2000-130176 | 5/2000 |
| JP | 2000-514897 | 11/2000 |
| JP | 3389748 B2 | 3/2003 |
| JP | 2003-293785 | 10/2003 |
| JP | 2004-044451 | 2/2004 |
| JP | 2004044452 A * | 2/2004 |
| JP | 2005-069178 | 3/2005 |
| WO | WO 98/02652 | 1/1998 |
| WO | 98/30790 A2 | 7/1998 |
| WO | 98/30790 A3 | 7/1998 |
| WO | 2005/024202 A1 | 3/2005 |
| WO | WO 2005028876 A1 * | 3/2005 |

OTHER PUBLICATIONS

Extended European Search Report issued in related application No. 06 01 6269, completed Oct. 10, 2007.

Extended European Search Report issued in related application No. 06 01 6455, completed Oct. 12, 2007.

Office Action issued in related U.S. Appl. No. 11/462,807, issued Aug. 3, 2007.

Search Report issued in related European application No. 06 01 7066 completed Oct. 16, 2006.

Office Action issued in related U.S. Appl. No. 11/462,807, mailed Dec. 19, 2007.

* cited by examiner

SUPERCHARGER WITH ELECTRIC MOTOR

This application claims priority from Japanese Patent Application No. 233772/2005, filed Aug. 11, 2005, the entire disclosure of which is incorporated herein by reference.

BACKGROUND OF THE INVENTION

1. Field of the Invention

The present invention relates to a supercharger with an electric motor, which has an electric motor assisting a rotational drive of a compressor in a supercharger driven by an exhaust gas of an internal combustion engine and compressing an intake air so as to supercharge.

2. Description of Related Art

In order to improve a performance of an internal combustion engine, there has been widely used a supercharger (also called as "turbocharger") driven by an exhaust gas of an internal combustion engine and compressing an intake air so as to supercharge. Further, there has been employed a supercharger with an electric motor in which an acceleration response or the like is improved by installing the electric motor on the same axis as a shaft of the supercharger and assisting a rotational drive of a compressor in an accelerated manner.

The following patent document 1 discloses a prior art relating to the supercharger with the electric motor. FIG. 1 is a cross sectional view showing a structure of a supercharger 50 with an electric motor disclosed in the patent document 1. A turbine impeller 52 and a turbine housing 51A surrounding it are arranged in an exhaust passage side of the supercharger 50. The turbine housing 51A has a scroll chamber 63 formed around the turbine impeller 52, and the scroll chamber 63 is communicated with the turbine impeller 52 via an annular gas flow path 64. Further, an exhaust port 65 coaxial with the turbine impeller 52 is formed in a center of the turbine housing 51A.

A compressor impeller 53 and a compressor housing 51B surrounding it are arranged in an intake passage side of the supercharger 50 with the electric motor. The compressor housing 51B has a scroll chamber 66 formed around the compressor impeller 53, and the scroll chamber 66 is communicated with the compressor impeller 53 via an annularly formed diffuser portion 67. Further, an intake port 68 coaxial with the compressor impeller 53 is formed in a center of the compressor housing 51C.

The turbine impeller 52 and the compressor impeller 53 are coupled by a shaft 54. The shaft 54 is rotatably supported by a bearing 55 installed in a center housing 51C. Further, in the center housing 51C, there is installed an electric motor 58 having a rotor 56 coaxially coupled to the shaft 54, and a stator 57 arranged around the rotor 56.

In the supercharger 50 with the electric motor structured as mentioned above, if an exhaust gas from an internal combustion engine is introduced to the scroll chamber 63, the exhaust gas flows to the exhaust port 65 via the annular gas flow path 64 so as to rotate the turbine impeller 52 in the process of passing through the turbine impeller 52. Accordingly, at the same time when the compressor impeller 53 coupled to the turbine impeller 52 via the shaft 54 is rotationally driven, the rotational drive is assisted by the electric motor 58, and the sucked air from the intake port is accelerated by the compressor impeller 53. The accelerated air is decelerated and pressurized in the process of passing through the diffuser portion 67 so as to be introduced to the scroll chamber 66, and is discharged from a discharge portion (not shown) so as to be supplied to the internal combustion engine.

In the supercharger 50 with the electric motor mentioned above, the electric motor 58 is rotated at a high speed during the operation of the supercharger, and is self-heated due to a windage loss and an eddy current loss. Further, since a high-temperature exhaust gas flows through the turbine, the electric motor 58 comes to a high temperature on the basis of a heat conduction from the turbine impeller 52 to the shaft 54, and from the shaft 54 to the rotor 56 of the electric motor 58. When the electric motor 58 comes to the high temperature, there are generated problems that an internal permanent magnet is demagnetized and an efficiency of the electric motor 58 is lowered. Accordingly, the supercharger in the patent document 1 is structured, as shown in FIG. 1, such that a cooling fluid flow path 60 is formed in an inner portion of a housing 51 so as to surround the electric motor 58, thereby flowing a cooling fluid 61 through the cooling fluid flow path 60 so as to cool the electric motor 58.

Regardless of whether or not the electric motor 58 mentioned above is mounted, in a motor vehicle provided with the supercharger, there is a case that the exhaust gas is flowed back to a combustion air for removing a nitrogen oxide in the exhaust gas. Further, a blow-by gas (a gas leaking to a crank chamber from a combustion chamber through a portion between a piston and a cylinder and containing an mixture) is discharged from the engine, however, there is a case that the blow-by gas is flowed back to the combustion air so as to be burnt again for reducing the air-fuel mixture discharged to the ambient air to the minimum. Accordingly, the exhaust gas, the blow-by gas or the like is contained in a part of the combustion air sucked by the supercharger. Since an oil mist of an engine oil is mixed into the exhaust gas, in the case of taking the supercharger 50 with the electric motor mentioned above as an example, the oil mist is attached to both side wall portions constituting a flow path in the process of passing through the diffuser portion 67. At this time, since the combustion air through the diffuser portion 67 is compressed and its temperature is raised, the oil mist attached to the wall portion is carbonized by a heat of the compressed air, and is stacked to be solidified. Accordingly, the solidified and stacked carbonized layer narrows the flow path of the diffuser portion 67 so as to increase a flow path resistance. Accordingly, there is a problem that it lowers a compression efficiency of the supercharger, and it causes a reduction of a reliability by extension. Further, there is a problem that the carbonized layer is peeled off due to a thermal expansion difference between the compressor housing and the carbonized layer, a vibration of the engine or the like, and there is a risk that it is sucked into the engine.

In order to solve the problem mentioned above, the following patent document 2 is disclosed as a prior art document relating to the supercharger on which the electric motor is not mounted. FIG. 2 is a cross sectional view showing a structure of a supercharger 70 disclosed in the patent document 2. As shown in FIG. 2, the supercharger 70 is structured such that the diffuser portion 67 is constituted by a diffuser flow path 67a, a seal plate 67b adjacent portion and a housing adjacent portion 67c. The seal plate 67b adjacent portion and a housing adjacent portion 67c face to each other such that the diffuser flow path 67a is arranged between them. A cooling path 72 circulating a cooling water is provided in the seal plate adjacent portion 71b. In accordance with this structure, since the cooling water is circulated in the cooling path 72, whereby the seal plate adjacent portion 67b is cooled, the oil mist is not carbonized and stacked even if the oil mist is attached to the seal plate adjacent portion 67b. In this case, in FIG. 2, the same reference numerals as those in FIG. 1 are attached to the corresponding portions to the constituting elements of the supercharger 50 with the electric motor shown in FIG. 1.

Patent Document 1:

Japanese Unexamined Patent Publication No. 2003-293785

Patent Document 2:

Japanese Unexamined Patent Publication No. 2004-44451

As mentioned above, in the supercharger on which the electric motor is not mounted, there has been proposed the technique of preventing the solidification and stack of the oil mist in the diffuser portion, however, the similar technique has not been proposed in the supercharger with the electric motor. Accordingly, in the supercharger with the electric motor, the oil mist is solidified to be stacked in the diffuser portion, and the solidified and stacked carbonized layer narrows the flow path of the diffuser portion 67 so as to increase a flow path resistance, so that there remains the problem that the compression efficiency of the supercharger is lowered.

Further, in the supercharger with the electric motor, there can be considered a matter that the solidification and stack of the oil mist in the diffuser portion 67 is prevented by arranging the similar cooling structure (the cooling path 72) to the patent document 2 mentioned above, however, in the case that the similar cooling path 72 to the patent document 2 is provided in the supercharger 50 with the electric motor in the patent document 1, it is necessary to independently arrange the cooling fluid flow path 60 and eth cooling path. Accordingly, as well as there are caused a complication of the structure, an increase of weight, an enlargement in size of the device and an increase of cost, there is a problem that an increase of weight of the vehicle is caused as a result of affecting a mounting property to the vehicle.

SUMMARY OF THE INVENTION

The present invention is made by taking the problems mentioned above into consideration, and an object of the present invention is to provide a supercharger with an electric motor which can improve a compression efficiency and a reliability of a supercharger by suppressing or preventing a solidification and stack of an oil mist in a diffuser portion and preventing an increase of a flow path resistance caused by a flow path of the diffuser portion being narrowed, and does not require an individual cooling system for cooling the electric motor and the diffuser portion, whereby simplifying a structure and suppressing an increase of weight, an enlargement in size of the device and an increase of cost.

In order to achieve the object mentioned above, in accordance with a first aspect of the present invention, there is provided a supercharger with an electric motor comprising:

a turbine impeller rotationally driven by an exhaust gas of an internal combustion engine;

a turbine housing surrounding the turbine impeller;

a compressor impeller coupled to the turbine impeller by a shaft and rotating so as to compress an intake air;

a compressor housing surrounding the compressor impeller;

an electric motor positioned between the turbine impeller and the compressor impeller and capable of rotationally driving the shaft;

a center housing rotatably supporting the shaft and having the electric motor built-in;

a scroll chamber annularly formed within the compressor housing and discharging a compressed air; and a diffuser portion extending to an outer side in a radial direction from an outlet of the compressor impeller and communicating the outlet of the compressor impeller and the scroll chamber, wherein the center housing has a first cooling structure portion cooling the electric motor by a cooling fluid, and a second cooling structure portion cooling the diffuser portion by the common cooling fluid with the cooling fluid of the first cooling structure.

In accordance with a second aspect of the present invention, there is provided a supercharger with an electric motor as recited in the first aspect mentioned above, wherein the electric motor is arranged at a position adjacent to the compressor impeller, the center housing has a cooling fluid flow path formed in such a manner as to surround the electric motor and be adjacent to the diffuser portion, and circulating the cooling fluid in an inner portion, the first cooling structure portion is formed at a position in the electric motor side in the cooling fluid flow path, and the second cooling structure portion is formed at a position in the diffuser portion side in the cooling fluid flow path.

In accordance with the first aspect mentioned above of the present invention, since the electric motor is cooled by the first cooling structure portion, and the diffuser portion is cooled by the second cooling structure portion, it is possible to suppress or prevent the solidification and stack of the oil mist in the diffuser portion. Further, since the electric motor and the diffuser portion are cooled by the common cooling fluid, in the first cooling structure portion and the second cooling structure portion, it is not necessary to independently supply the cooling fluid to the respective cooling structure portions. Accordingly, even if the cooling structure portion is provided for cooling both the electric motor and the diffuser portion, it is possible to simplify the cooling system.

In accordance with the second aspect mentioned above of the present invention, since the electric motor is arranged at the position adjacent to the compressor impeller, and the cooling fluid flow path having the first cooling structure portion and the second cooling structure portion is formed around it, it is possible to achieve the cooling of the electric motor and the cooling of the diffuser portion by the single cooling system. Accordingly, since it is not necessary to independently arrange the first cooling structure portion cooling the electric motor and the second cooling structure portion cooling the diffuser portion. That is, since it is not necessary to arrange the individual cooling systems, it is possible to simplify the cooing system, and it is possible to suppress an increase of weight, an enlargement of the device and an increase of cost. Further, since it is possible to limit the effect applied to the mounting property to the vehicle to the minimum, it can greatly contribute to a weight saving of the vehicle.

In other words, in accordance with the present invention, it is possible to improve a compression efficiency and a reliability of the supercharger by suppressing or preventing the solidification and stack of the oil mist in the diffuser portion so as to prevent the increase of the flow path resistance due to the flow path of the diffuser portion being narrowed, and the individual cooling systems are not required for cooling the electric motor and the diffuser portion, whereby there can be obtained an excellent effect that it is possible to simplify the structure, and it is possible to suppress the increase of weight, the increase of the device and the increase of cost.

DESCRIPTION OF THE PREFERRED EMBODIMENT

Figure 1:
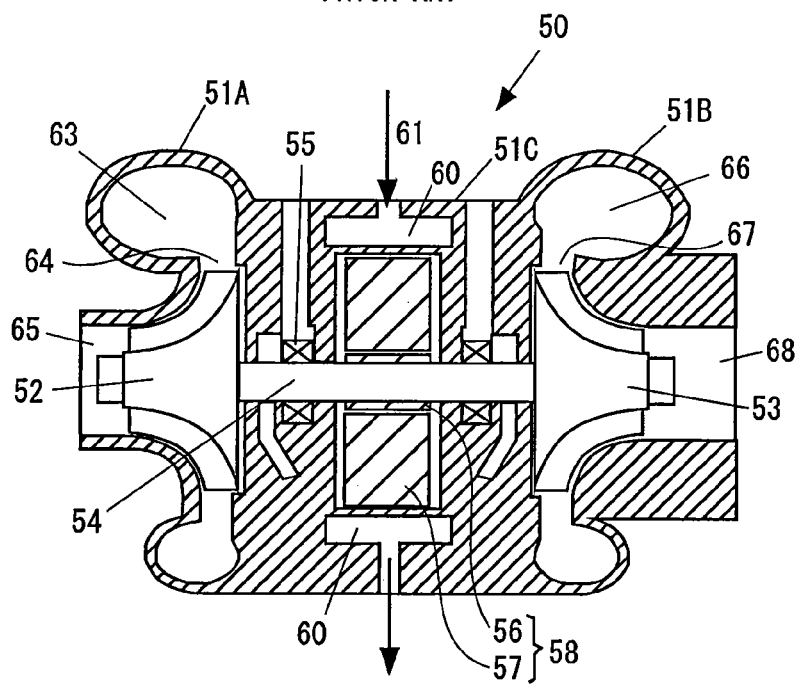
FIG. 1 is a view explaining a prior art.
Figure 2:
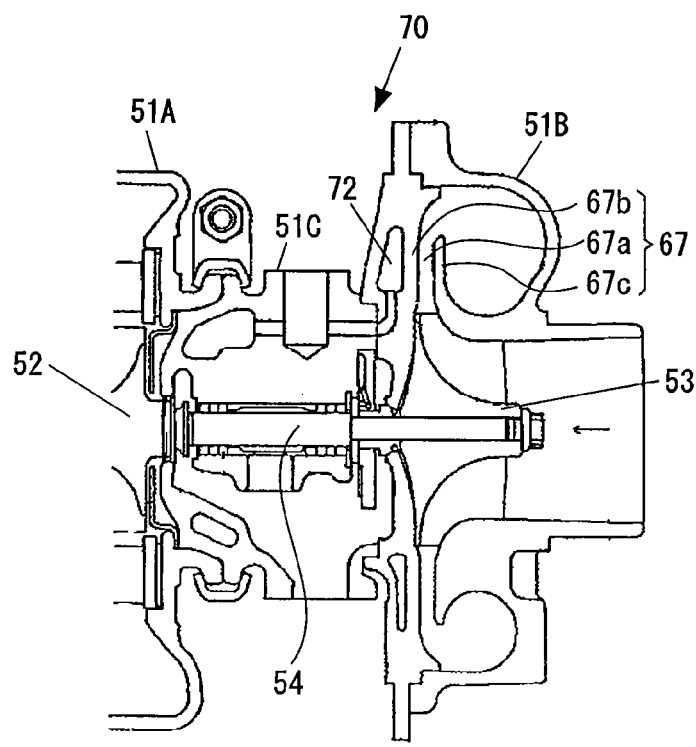
FIG. 2 is a view explaining the other prior art.

A description will be in detail given below of a preferable embodiment in accordance with the present invention with reference to the accompanying drawings. In this case, the same reference numerals are attached to the common portions in each of the drawings, and an overlapping description will be omitted.

Figure 3:
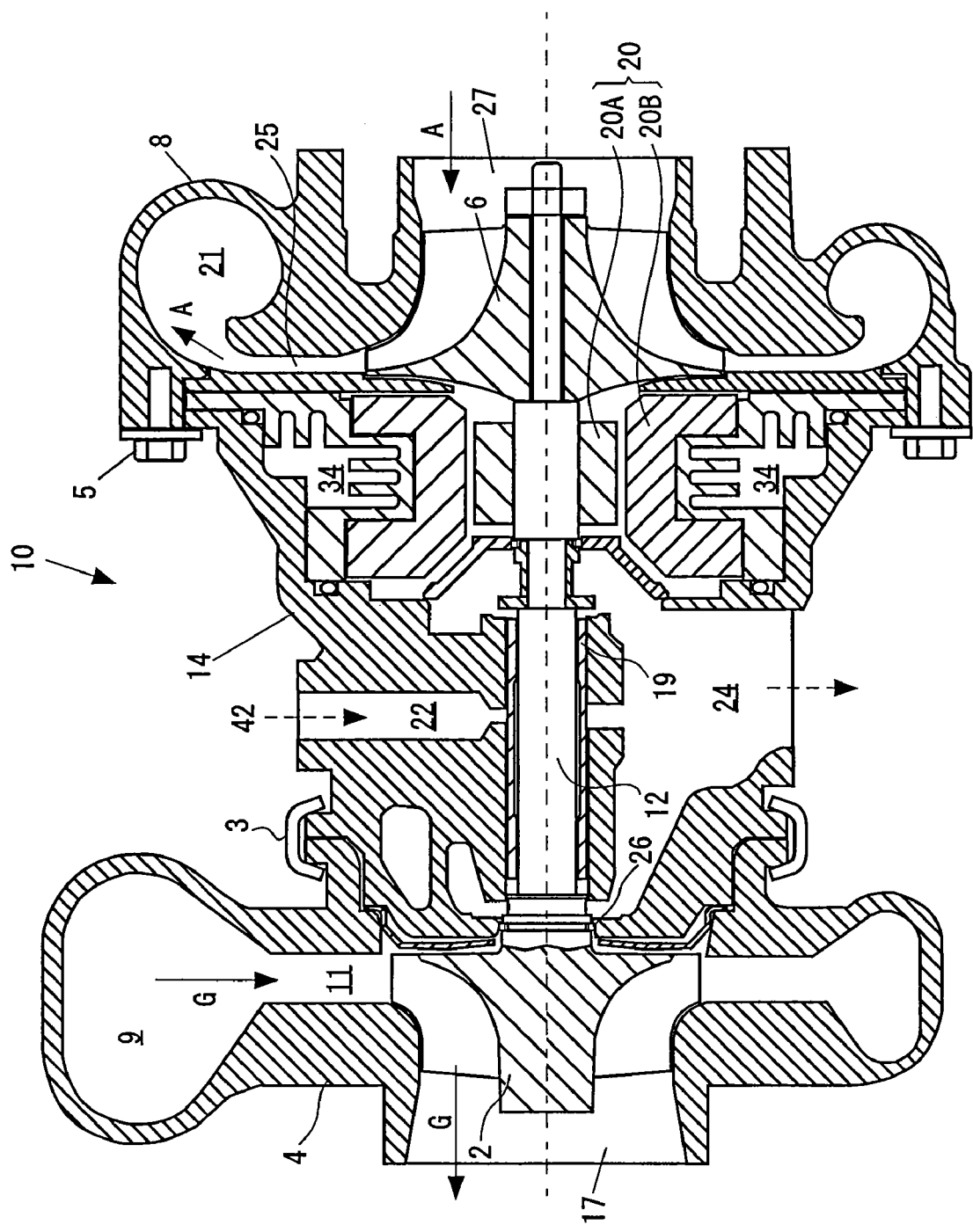
FIG. 3 is a cross sectional view showing an embodiment in accordance with the present invention.

FIG. 3 is a cross sectional view of a supercharger with an electric motor in accordance with the embodiment of the present invention. As shown in FIG. 3, the supercharger 10 with the electric motor is constituted by constituting elements such as a turbine impeller 2, a turbine housing 4, a shaft 12, a compressor impeller 6, a compressor housing 8, an electric motor 20, a center housing 14 and the like.

In an exhaust passage side, there are arranged the turbine impeller 2 rotationally driven by an exhaust gas G of an internal combustion engine, and the turbine housing 4 surrounding the turbine impeller 2. The turbine housing 4 has a scroll chamber 9 formed around the turbine impeller 2, and the scroll chamber 13 is communicated with the turbine impeller 2 via an annular gas flow path 11. Further, an exhaust port 17 coaxial with the turbine impeller 2 is formed in a center of the turbine housing 4.

In an intake side passage, there are arranged the compressor impeller 6 compressing an intake air, and the compressor housing 8 surrounding the compressor impeller 6. The compressor housing 8 has a scroll chamber 21 annularly formed around the compressor impeller 6 and discharging a compressed air A. An annular diffuser portion 25 is formed between an outlet of the compressor impeller 6 and the scroll chamber 21. The annular diffuser portion 25 extends to an outer side in a radial direction from the outlet of the compressor impeller 6 in such a manner as to communicate between them. Accordingly, the air A accelerated by the compressor impeller 6 is decelerated and pressurized so as to be introduced to the scroll chamber 21. Further, an intake port 27 coaxial with the compressor impeller 6 is formed in a center of the compressor housing 8.

The turbine impeller 2 and the compressor impeller 6 are coupled by the shaft 12, and the shaft 12 is rotatably supported by a bearing 19 installed in the center housing 14. The turbine housing 4 and the center housing 14 are coupled by a coupling 3, and the compressor housing 8 and the center housing are coupled by a bolt 5.

The electric motor 20 is installed in the center housing 14 and is arranged at a position adjacent to the compressor impeller 6. The electric motor 20 is constituted by a rotor 20A which is coaxially coupled to the shaft 12, rotates together with the shaft 12 and is formed by a permanent magnet, and a stator 20B which is arranged around the rotor 20A and is formed by a coil.

In the center housing 14, there are formed an oil supply path 22 for supplying a lubricating fluid 42 to the bearing 16, and an oil discharge path 24 for discharging the lubricating fluid 42 lubricating and cooling the bearing 19 while passing through an inner portion of the bearing 16. The structure is made such that the lubricating fluid 42 having a temperature, for example, about 80° C. is supplied to the oil supply path 22 by a lubricating fluid pump (not shown) installed in an external portion.

In the turbine impeller 2 side of the center housing 14, there is interposed a turbine side seal ring 26 for preventing the lubricating fluid 42 from leaking from a gap between the center housing 14 and the shaft 12.

Figure 4:
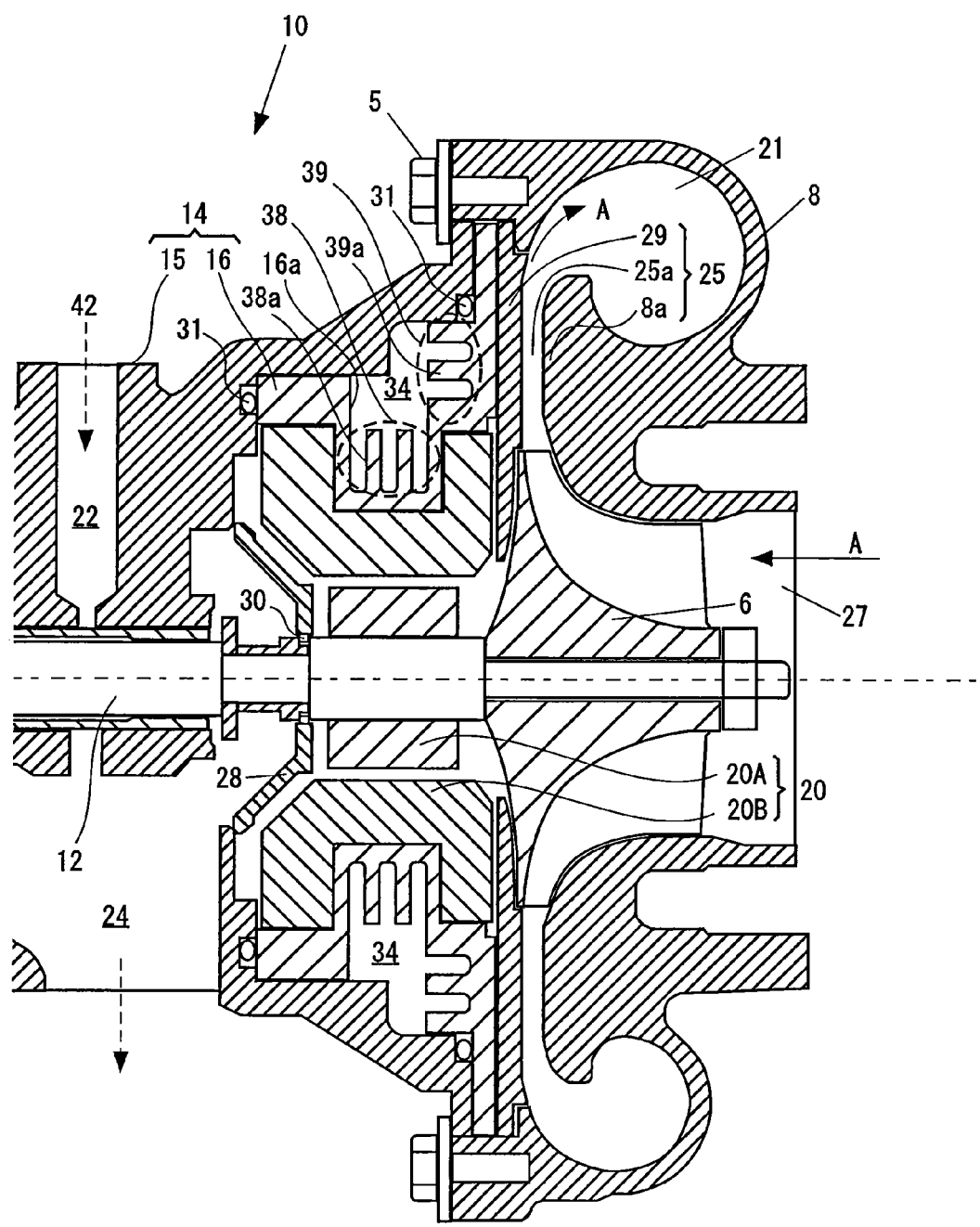
FIG. 4 is a partly enlarged view of FIG. 3.

FIG. 4 is a partly enlarged view of FIG. 3. As shown in FIG. 4, a compressor side seal ring 30 preventing the lubricating fluid from leaking from the gap is interposed between a turbine side seal plate 28 provided at a position between the electric motor 20 within the center housing 14 and the bearing portion, and the shaft 12.

A disc-shaped seal plate 29 is interposed between the center housing 14 and the compressor housing 8, and the diffuser portion 25 in accordance with the present embodiment is defined by a seal plate 29, a portion 8a facing to the seal plate 29 in the compressor housing 8, and a flow path 25a therebetween.

Further, the center housing 14 has a first cooling structure portion 38 cooling the electric motor 20 by the cooling fluid, and a second cooling structure portion 39 cooling the diffuser portion 25 by the common cooling fluid with the first cooling structure 38. A description will be in more detail given below of the first cooling structure portion 38 and the second cooling structure portion 39.

As shown in FIG. 4, the center housing 14 is provided with a housing main body 15, and a flow path forming member 16, and has a cooling fluid flow path 34 between the housing main body 15 and the flow path forming member 16. The flow path forming member 16 has a flow path concave portion 16a for circulating the cooling fluid, is entirely formed in a ring shape, and is fitted to the housing main body 15 so as to be inserted and attached thereto. Further, the cooling fluid flow path 34 is defined by the housing main body 15 and the flow path concave portion 16a of the flow path forming member 16. An O-ring 31 is interposed between the housing main body 15 and the flow path forming member 16, and a water tight is held therebetween.

The cooling fluid flow path 34 extends in a peripheral direction within the center housing 14 so as to be annularly formed, and is structured such as to circulate the cooling fluid for cooling the electric motor 20 and the diffuser portion 25 in an inner portion. The cooling fluid flow path 34 may be formed so as to completely make a circuit of an outer periphery of the electric motor 20, or may be formed in a C shape as seen from an axial direction of the shaft 12. The cooling fluid is supplied to the cooling fluid flow path 34 by a cooling fluid pump (not shown) installed in an external portion via a cooling fluid supply port (not shown), and is discharged to the external portion from a cooling fluid discharge port (not shown). The cooling fluid can employ, for example, a water. Further, an oil (a lubricating fluid 42 or the like) may be used as the cooling fluid.

As shown in FIG. 4, the first cooling structure portion 38 mentioned above is formed at a position in the electric motor 20 side of the cooling fluid flow path 34, and the second cooling structure portion 39 mentioned above is formed at a position in the diffuser portion 25 side of the cooling fluid flow path 34. Further, a plurality of fin-shaped portions 38a and 39a are formed in the first cooling structure portion 38 and the second cooling structure portion 39, thereby widening a heat transfer area so as to increase an efficiency of a thermal conduction. Further, a thickness of the position constructing the second cooling structure portion 39 is set such that a heat exchange between the cooling fluid and the diffuser portion 25 can be sufficiently executed. Further, on the basis of the structure mentioned above, the heat exchange is executed between the cooling fluid flowing through the cooling fluid flow path 34 and the electric motor 20, and between the cooling fluid and the diffuser portion 25. In other words, the structure is made such as to transfer the heat of the electric motor 20 and the diffuser portion 25 to the cooling fluid in the cooling fluid flow path 34 so as to cool the electric motor 20 and the diffuser portion 25.

In this case, in the present embodiment, the flow path forming member 16 and the seal plate 29 are structured as the independent bodies, however, they may be constituted by an integrally formed member.

Next, a description will be given of an operation and an effect of the supercharger 10 with the electric motor structured as mentioned above, with reference to FIGS. 3 and 4.

In the supercharger 10 with the electric motor, when an exhaust gas (G) from the internal combustion engine is introduced to the scroll chamber 9, the exhaust gas G flows to the exhaust port 17 via the annular gas flow path 11 so as to rotate the turbine impeller 2 in the process of passing through the turbine impeller 2. Then, at the same time when the compressor impeller 6 coupled to the turbine impeller 2 via the shaft 12 is rotationally driven, the rotational drive is assisted by the electric motor 20, and the air A sucked from the intake port 27 by the compressor impeller 6 is accelerated. The accelerated air A is decelerated and pressurized in the process of passing through the diffuser portion 25 so as to be introduced to the scroll chamber 21, and is discharged from a discharge portion (not shown) so as to be supplied to the internal combustion engine. The air sucked by the compressor impeller 6 has a temperature, for example, 20° C. and a normal pressure, is increased, for example, to 180° C. and 1.5 atmospheric pressure in an outlet of the compressor impeller, and is increased, for example, to 180° C. and 2.0 atmospheric pressure in an outlet of the diffuser portion 25.

Further, the cooling fluid is supplied to the cooling fluid flow path 34, thereby cooling the electric motor 20 from the periphery thereof by the first cooling structure portion 38, and cooling the adjacent portion (hereinafter, refer to "seal plate adjacent portion") to the second cooling structure portion 39 in the diffuser portion 25 by the second cooling structure portion 39. As a result, a temperature increase of the seal plate adjacent portion is suppressed to 120° C. or less. It is confirmed that the engine oil is not carbonized but has a fluidity at about 120° C. Accordingly, even in the case that the oil mist is attached to the seal plate adjacent portion in the process that the intake air containing the oil mist of the engine oil passes through the diffuser portion 25, the oil mist is not solidified and stacked to the attached portion, but is blown away to the scroll chamber 21 by an air flow.

Further, since the seal plate adjacent portion is cooled, whereby the compressed air passing through the diffuser portion 25 is cooled, the portion 8a adjacent to the flow path 25a in the compressor housing 8 is cooled via the compressed air. Accordingly, even in the case that the oil mist is attached to the portion 8a, the oil mist is not solidified and stacked to the attached portion, but is blown away to the scroll chamber by the air flow.

In this case, the structure may be made such that an oil repellant film is formed by a material having no affinity to the engine oil and repelling the oil mist, in the seal plate adjacent portion and the portion 8a of the compressor housing 8, thereby preventing the oil mist from being attached to the portion. As the material of the oil repellent film, for example, a fluorine contained resin (a polytetrafluorethylene) which is excellent in a heat resistance and a corrosion resistance is preferably employed.

As mentioned above, in accordance with the supercharger 10 with the electric motor of the present invention, since the electric motor 20 is cooled by the first cooling structure portion 38, and the diffuser portion 25 is cooled by the second cooling structure portion 39, it is possible to suppress or prevent the solidification and stack of the oil mist in the diffuser portion 25. Further, in the first cooling structure portion 38 and the second cooling structure portion 39, since the electric motor 20 and the diffuser portion 25 are cooled by the common cooling fluid, it is not necessary to independently supply the cooling fluid to the respective cooling structures. Therefore, even if the cooling structure portions are provided for cooling both of the electric motor 20 and the diffuser portion 25, it is possible to simplify the cooling system.

Further, in accordance with the supercharger 10 with the electric motor of the present invention, since the electric motor 20 is arranged at the position adjacent to the compressor impeller 6, and the cooling fluid flow path 34 having the first cooling structure portion 38 and the second cooling structure portion 39 is formed around it, it is possible to achieve the cooling of the electric motor 20 and the cooling of the diffuser portion 25 by the single cooling system. Accordingly, since it is not necessary to independently arrange the first cooling structure portion 38 cooling the electric motor 20, and the second cooling structure portion 39 cooling the diffuser portion 25, in other words, since it is not necessary to arrange the individual cooling system, the cooling system can be simplified, and it is possible to suppress the increase of weight, the enlargement of the device and the increase of cost. Further, since it is possible to limit the effect applied to the mounting property to the vehicle to the minimum thereby, it can greatly contribute to the weight saving of the vehicle.

Therefore, in accordance with the present invention, it is possible to improve a compression efficiency and a reliability of the supercharger by suppressing or preventing the solidification and stack of the oil mist in the diffuser portion so as to prevent the increase of the flow path resistance due to the flow path of the diffuser portion being narrowed, and the individual cooling systems are not required for cooling the electric motor and the diffuser portion, whereby there can be obtained an excellent effect that it is possible to simplify the structure, and it is possible to suppress the increase of weight, the increase of the device and the increase of cost.

In addition, it goes without saying that the present invention is not limited to the embodiment mentioned above, but can be variously modified within the range of the scope of the present invention.

The invention claimed is:

1. A supercharger with an electric motor comprising:
 (a) a turbine impeller rotationally driven by an exhaust gas of an internal combustion engine;
 (b) a turbine housing surrounding the turbine impeller;
 (c) a compressor impeller coupled to the turbine impeller by a shaft and rotating so as to compress an intake air;
 (d) compressor housing surrounding the compressor impeller;

(e) an electric motor positioned between the turbine impeller and the compressor impeller so as to rotationally drive the shaft;
(f) a center housing rotatably supporting the shaft and having the electric motor built-in, wherein the center housing comprises
   i. a housing main body;
   ii. a flow path forming member that is formed in a ring shape and is inserted and attached to the housing main body, and the flow path forming member comprises a first cooling structure portion and a second cooling structure portion; and
   iii. a cooling fluid flow path defined by the housing main body and the flow path forming member, wherein the cooling fluid flow path surrounds the electric motor;
(g) a scroll chamber annularly formed within the compressor housing and discharging a compressed air; and
(h) a diffuser portion extending to an outer side in a radial direction from an outlet of the compressor impeller and communicating the outlet of the compressor impeller and the scroll chamber,
wherein the electric motor is arranged at a position adjacent to the compressor impeller and the cooling fluid flow path is formed so as to be adjacent to the diffuser portion, wherein the cooling fluid flow path circulates cooling fluid in an inner portion of the center housing and the first cooling structure portion is disposed at a position on an electric motor side of the cooling fluid flow path so as to cool the electric motor by heat transfer, and the second cooling structure portion is disposed at a position on a diffuser portion side of the cooling fluid flow path so as to cool the diffuser portion by heat transfer.

2. A supercharger with an electric motor as recited by claim 1, wherein the first cooling structure portion comprises a first fin-shaped portion and the second cooling structure portion comprises a second fin-shaped portion.

3. A supercharger with an electric motor as recited by claim 1, wherein the diffuser portion comprises a seal plate, a first portion of the compressor housing, and a first flow path for pressurized air, wherein the first flow path is formed between the seal plate and the first portion of the compressor housing.

4. A supercharger with an electric motor as recited by claim 3, wherein the seal plate is disposed between the center housing and the compressor housing and the seal plate is in contact with the second cooling structure portion of the flow path forming member.

5. A supercharger with an electric motor as recited by claim 3, wherein a surface of the seal plate and a surface of the first portion of the compressor housing are provided with an oil repellant film.

6. A supercharger with an electric motor as recited by claim 5, wherein the oil repellant film is a fluorine containing resin.

7. A supercharger with an electric motor as recited by claim 6, wherein the fluorine containing resin comprises polytetrafluorethylene.

* * * * *